Patented Oct. 15, 1940

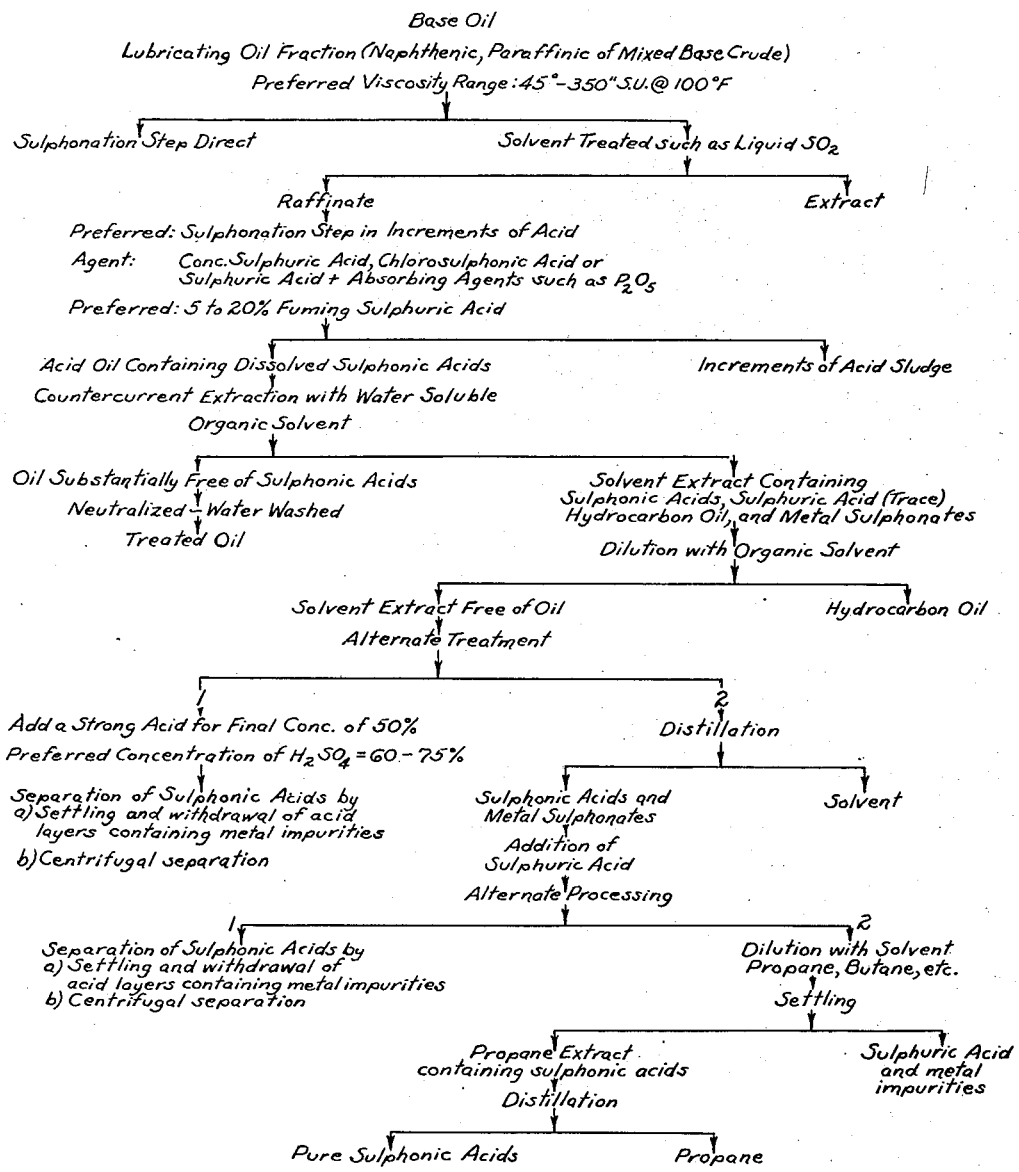

2,218,174

UNITED STATES PATENT OFFICE 2,218,174

PREPARATION OF SULPHONIC ACIDS

Arthur Lazar and Paul Moritz Ruedrich, Berkeley, Calif., assignors to Tide Water Associated Oil Company, San Francisco, Calif., a corporation of Delaware Application March 30, 1938, Serial No. 198,976

8 Claims. (Cl. 260—504)

This invention relates to the preparation and purification of sulphonic acids.

An object of this invention is to provide a process whereby hydrocarbon oils may be sulphonated and the sulphonic acids thus produced separated from the residual oil.

A further object is to provide a process whereby the crude sulphonic acids may be purified to enable the recovery of sulphonic acids substantially free of contamination products.

Another object is to prepare substantially pure sulphonic acids which are especially adapted to form metal soaps of a high degree of compatibility with hydrocarbon oils.

An object of this invention is to treat a hydrocarbon oil in such a manner that an isolation of classes of chemical constituents is accomplished.

Other objects of invention will be apparent as the subject is more fully disclosed.

The usual processes of preparation and purification of sulphonic acids involve the sulphonation of reactive hydrocarbons in oils with fuming sulphuric acid, the neutralization of sulphonic acids formed with an alkaline reagent and the separation and purification of such acids over their metal salts.

By this is meant that the sulphonic acids are extracted as water soluble alkali salts, the latter being converted to less soluble alkaline earth metal salts, which then can be purified by either recrystallization or any other conventional means. From the purified salts, the pure sulphonic acids then can be isolated by acidification with mineral acids.

This invention provides a process of preparation, extraction, and purification which may be applied to the production of all types of sulphonic acids. One of the advantages of such process is that it permits the preparation of substantially pure sulphonic acids utilizing only standard metal equipment.

The type of hydrocarbon oil, which may be used as the starting point of the sulphonation process, is governed commercially solely by the necessary qualification that appropriate yields of sulphonic acids can be obtained therefrom by sulphonation, but the process is broadly applicable to the production of sulphonic acids from all sulphonatable hydrocarbon oils, such as may initially be obtained, for instance, from a lubricating oil fraction from petroleum. Such a fraction may be from naphthenic, paraffinic or mixed base crudes, and the preferred viscosity range is from 45 to 350 viscosity Saybolt Universal at 100° F.

Such base oil fraction may be sulphonated directly or may be first subjected to treatment by a solvent refining process, such as is well known in the use of liquid sulphur dioxide, furfural, benzol-sulphur dioxide, phenol, cresylic acid, dichlorethylether, or by other well known solvent refining processes, whereby an extract is removed therefrom. The material which is insoluble in the selective solvent will hereafter be termed raffinate, and is an oil which is preferably the raw material used for sulphonation.

For the sulphonation of the base oil concentrated sulphuric acid is recommended, however, other sulphonating agents may be used. For example, chlorosulphonic acid, or sulphuric acid in conjunction with certain water absorbing ingredients, such as phosphorus pentoxide, may be used to aid the sulphonation process. By concentrated sulphuric acid, 66° Bé. up to 50% fuming sulphuric acid is meant; however an acid strength of 5 to 20% fuming sulphuric acid is preferred.

In the sulphonation of the raffinate the acid is preferably added in increments of from 5 to 10 pounds per barrel of oil. The first few increments attack oil constituents which are easily sulphonated, oxidized or polymerized and remove them as a tarry mass in the acid sludge. Through the initial removal of such constituents, acid used in subsequent increments is not spent in side reactions, but is directed in substantially full strength towards the sulphonation of hydrocarbons to yield sulphonic acids. By the use of acid in increments therefore acid sludges can be produced in which the concentration of acid tar progressively decreases while the concentration of sulphonic acids which remain dissolved in the oil increases.

To illustrate the increase in concentration of sulphonic acids which remain dissolved in the oil, with progressive applications of increments of acid, the following data are given.

| Increment number | Quantity of acid used | Percent sulphonic acids by weight dissolved in the oil |
|---|---|---|
| 1 | 10 lbs. per barrel of 15% fuming $H_2SO_4$ | 2.63 |
| 2 | do | 4.30 |
| 3 | do | 5.59 |

The percent of sulphonic acids which remains in the oil increases with the increments of acid.

It is found, however, that as the concentration of sulphonic acids in the oil is increased, the sulphonating action of the sulphuric acid gradually decreases. In other words, the sulphonation process slackens and the efficiency of the treating reagent decreases, in proportion to the accumulation of sulphonated components in the oil. For this reason it is often preferred to remove the sulphonic acids, after their concentration has reached about 5% by weight, as an intermediate processing step. Such removal can be accomplished by neutralization with an alkali, thus converting the sulphonic acids into soaps. It is preferred, however, to accomplish such removal by the process shown in the accompanying drawing, which will be described in detail below.

By using this step procedure of alternate sulphonation and removal of sulphonated products, the advantages are:
1. Better utilization of the treating agent.
2. Increased yields of sulphonic acids.
3. A segregation of sulphonic acids according to types, as explained in detail below.

This procedure is highly recommended in the manufacture of technical white oils and medicinal type oils, or any other type of highly refined mineral oil. As an example, it is possible to obtain a water white odorless and non-fluorescent oil by treatment with considerably less acid by this step procedure, than by the procedure in which the intermediate removal of sulphonated products is omitted.

Our process, however, is so flexible that it may be applied to acid oils containing sulphonic acids or acid sludges irrespective of the means or manner of adding the sulphonating agent. The use of increments of acid is preferred largely for ease of operation in that it effects a partial preliminary isolation of chemical constituents.

The total quantity of acid which may be used may vary up to 100 percent by volume but in most instances 1.5 to 20 percent by volume is used. After several increments of acid are applied the acid produces sulphonic acids which are predominately of the oil soluble type.

The temperatures employed in the above described application of sulphuric acid are regulated to produce the desired sulphonation. When relatively low rates of acid are employed the maximum sulphonating temperature is held to below about 130° F. After an initial application of acid and withdrawal of sludge the sulphonation of the residual oil may be performed at temperatures up to 350° F., but temperatures should be avoided at which the sulphuric acid usually acts as an oxidizing agent.

In the practice of the invention, the preparation of sulphonic acids and other by-products may often be profitably combined with the refining of a lubricating oil fraction. In so doing just sufficient acid is employed to suitably refine the oil and produce an equivalent quantity of sulphonic acids. When such treatment is performed there is produced (1) an acid oil containing free sulphonic acids (2) acid sludges isolated in increments. These products are processed separately and the treatment of the acid oil is described in detail below, and illustrated in the accompany drawing. The processing of the acid sludges is made the subject of our copending application Serial Number 268,490, filed April 18, 1939.

*Treatment of acid oil*

When acid oil is treated by the conventional method, referred to hereinbefore, it is first neutralized with an alkaline reagent and the sulphonic acids converted to metal sulphonates. In the present process, however, this neutralization step is avoided and the sulphonic acids extracted directly from the oil in which they are dissolved. Prior to the extraction of the sulphonic acids from the acid oil it is often found advisable to centrifuge the oil for complete removal of suspended acid sludge. This intermediate step facilitates further handling, inasmuch as the contamination of the sulphonic acids is avoided and occlusion of certain impurities, discussed later in detail, is minimized. Modern refining practice, incidentally, may include the centrifuging operation, following as a normal procedure the mechanical acid contacting step. In other words, the added precaution of centrifuging mentioned above is specifically recommended for such oils, which are obtained by the old batch treating method in air blown agitators.

The extraction of sulphonic acids from the acid oil may be accomplished by the use of organic solvents or aqueous solutions thereof. Organic solvents which are completely water soluble are preferred. The proportion of solvent used varies with the content of sulphonic acids but is usually in the range of 1 to 10% by volume of the oil. The preferred method of extraction is a countercurrent treatment with the solvent.

By the use of countercurrent extraction methods it is found that the efficiency of extraction is tremendously increased. Further, it is possible to use aqueous solutions containing high concentrations of organic solvents and minimize the quantity of mineral oil which is occluded with the sulphonic acids in the solvent extract. It is also possible to use organic solvents undiluted, for extraction, an operation which has not been found practical heretofore. Known extraction methods usually employ aqueous solutions of certain organic solvents to remove the sulphonic acids. The separation of the aqueous solvent from the sulphonic acids, in subsequent processing is more difficult than the separation of the pure solvent only from the sulphonic acids. For example, the step involving the dehydration of the sulphonic acids is eliminated and organic solvents can be used which distill at relatively low temperatures, thus facilitating the recovery of the pure solvents.

Organic solvents, like mono and polyhydric alcohols, ketones, oxides, halogenated alcohols, acetates, ethers, esters, or aldehydes can be used in our process either undiluted or in aqueous solutions. A few of those which are suitable are:

Alcohols:
    Methyl alcohol
    Ethyl alcohol
    Propyl alcohols
    Ethylene glycol
    Glycerol
    Hexahydric alcohols Ketones:
    Acetone
    Diacetone Oxides:
    Ethylene oxide
    Dioxan Esters:
    Ethylene glycol acetate
    Diethylene glycol acetate Ethers:
    Methyl ether of ethylene glycol
    Ethylether of ethylene glycol Ether-esters:
    Ethyl ether of diethylene glycol acetate Aldehydes:
    Formaldehyde
    Acetaldehyde Chlorhydrins:
    Ethylene chlorhydrin
    Diethylene chlorhydrin When organic solvents are employed to extract the sulphonic acids from the oil, those solvents which possess low oil solubility characteristics are particularly adaptable to our process. Of such solvents, methyl alcohol, ethyl alcohol, and acetone are preferred as they are more easily recovered by distillation due to their low boiling points.

Any water soluble oxygen containing organic solvent can be used and such are preferentially used, but other solvents which are insoluble in water and do not contain oxygen may be used to extract the sulphonic acids provided they are insoluble in the hydrocarbons.

As stated above aqueous solutions of organic solvents may also be employed, e. g. aqueous ethyl alcohol. The ratio of alcohol to water is usually held in the range of 1:1 to 1:3 with a ratio of 1:1 being preferred. It has been observed that some of the solvents when used in aqueous solutions as extraction media have the property of occluding more hydrocarbon oil than others. For such reasons, and also in view of economy of operation it is advisable to use aqueous solutions of methyl and/or ethyl alcohol, as the latter extract a maximum quantity of sulphonic acids and occlude a minimum quantity of hydrocarbon oil.

After extraction of the sulphonic acids, the aqueous solvent extract under certain conditions may have the following composition:

|  | Percent by volume |
|---|---|
| Sulphonic acids | 40 |
| Hydrocarbon oil | 30 |
| Alcohol | 15 |
| Water | 15 | but even when the solvent extracts contain relatively high concentrations of hydrocarbon oils a means of separation of such oil is included in this process. To separate such occluded hydrocarbons from the mixture the ratio of alcohol to water is increased to about 3:1, whereby the hydrocarbon oil rises to the top to form an upper layer. Normally the solubility of oil in the solvent is quite low and the quantity of oil in solution is usually influenced by the concentration of sulphonic acids in the mixture. The higher the sulphonic acid concentration the greater the solubility effect exerted by the acids for the oil. Through the further addition of alcohol such an influence is minimized and the hydrocarbon oil liberated.

In contradistinction to the example of aqueous solvents, given above, the use of substantially anhydrous solvents will give superior results, inasmuch as the hydrocarbon content of the extracted portion is greatly reduced. As an example in the case of anhydrous methyl alcohol the composition of the extracted portion under certain conditions is as follows:

|  | Percent |
|---|---|
| Sulphonic acids | 45 |
| Hydrocarbon oil | trace |
| Methyl alcohol | 55 |

In the above cited example, it is apparent that the step requiring additional use of solvent for removal of occluded hydrocarbons has become unnecessary. However, if hydrocarbons should be occluded in the extracted portion, their separation can be effected by further dilution of the extract with anhydrous solvent, whereby the hydrocarbon oil will be thrown out of solution and can be withdrawn by the usual method of gravity separation.

In the process described, which involves the use of a substantially anhydrous organic solvent, to isolate sulphonic acids from acid treated mineral oils, it was stated that solvents are preferred, which are relatively insoluble in mineral oil. However, small amounts of solvents will remain in the oil after the extraction is completed, and will require recovery by conventional means such as water washing or distillation.

We have shown up to this point (1) the step of countercurrent extraction of sulphonic acids from oil with organic solvents or aqueous solutions thereof, (2) the step of removing occluded hydrocarbon oil by diluting the solvent extract (aqueous or not) with more of the organic solvent.

The extract, now substantially freed of unsulphonated hydrocarbon oil and containing the sulphonic acids, also contains undesirable contaminants such as sulphonates of iron and lead. The formation of these organic iron and lead sulphonates is the result of the action of the sulphonic acids on the metal of the refinery equipment with which they come in contact during processing. The complete removal of such impurities is essential in the preparation of pure sulphonic acids, sulphonic salts, and other derivatives of sulphonic acids where purity of product is of prime importance.

An illustration of the need for pure products is in the use of soaps of sulphonic acids in the dry cleaning industry. If iron and lead soaps are present in the soaps employed, such as sodium, potassium, and ammonium sulphonates, very undesirable results are obtained and fabrics seriously injured.

Pure sulphonic acids are demanded also in the lacquer and varnish industry and the tanning industry. When metal sulphonates, such as those of lead, cobalt and manganese, are used as drying catalysts in the compounding of lacquers and varnishes, iron sulphonate, if present, would seriously interfere with such action. In the tanning industry the leather is subjected to the action of a solution of sodium or potassium sulphonates in a solvent. When iron or lead sulphonates are present these may precipitate on the leather as a gummy deposit. Such deposits cause discoloration and have deleterious effects on the fine texture and smoothness of the leather. In time the metal sulphonates may be hydrolized into metal oxides and free acid, the latter injuring the leather through chemical attack.

Further, it is noted that ammonium and certain organic base sulphonates have insecticidal properties. Iron and lead sulphonates, if present in the sulphonic acids used to prepare the above products, e. g., the combination of an organic amine and sulphonic acids, would be retained in the insecticidal solution to eventually precipitate out as undesirable and harmful deposits.

The solvent extract, containing the sulphonic acids and impurities, is subjected to the action of a strong acid which is capable of separating out the metal contaminants as inorganic metal salts. By strong acid is meant one which has a high hydrogen ion concentration and sulphuric acid is preferred for this operation, although other strong acids such as hydrochloric, phosphoric, and the like may be used.

When using a strong mineral acid the highly soluble metal sulphonates are converted into inorganic metal salts which are insoluble in the sulphonic acids. Concentrated sulphuric acid, which is preferred, serves another important function in also accomplishing a substantially complete dehydration of the sulphonic acids. The organic solvents or aqueous organic solvents are soluble in the acid layer, whereas the sulphonic acids are substantially insoluble and are salted out of solution. In order to obtain such a salting out effect it is necessary for the sulphuric acid layer to be at least of 50% acid strength, the preferred concentration being 60-75% sulphuric acid. The lower layer containing the sulphuric acid, alcohol, water and metal sulphates is withdrawn and the upper layer centrifuged to obtain pure sulphonic acid.

An alternate procedure for separating pure sulphonic acids from the extract (aqueous or not) is to remove the initial solvent by distillation preferably with vacuum whereby the crude sulphonic acids and small amounts of sulphuric acid remain as a residue in the still. This still residue is then treated with strong acid, sulphuric acid being preferred. As in the previous illustration of the purification procedure the final sulphuric acid concentration must be a minimum of 50% strength. This minimum concentration is necessary to insure complete removal of undesirable metal contaminants and at the same time to prevent sulphonic acids from going into solution in the sulphuric acid layer.

In this procedure it is advantageous to use acid in excess of 90% concentration, as, for example, 66° Bé. or 98% sulphuric acid. The upper sulphonic acid layer may be isolated and purified also by centrifuging. The preferred method in this case, however, is to extract the sulphonic acids with an organic solvent preferably hydrocarbon solvents, such as propane, butane, petroleum ether, which dissolve the sulphonic acids and leave the sulphuric acids and metal impurities undissolved. The more volatile solvents, e. g., propane, or butane are preferred because after decanting the extract from the sulphuric acid the sulphonic acids may be isolated in a substantially pure state by the removal of the solvent by distillation at low temperatures and further the preferred solvent is preferably of such boiling range that there will be substantially no reaction with the sulphonic acids at the temperature of distillation.

The extraction of sulphonic acids from the acid oil with non-aqueous organic solvents has the following advantages over the use of aqueous organic solvents:

(1) In view of the fact that the extract is substantially water-free, corrosion to metal equipment is reduced to a minimum.

(2) The presence of relatively dilute aqueous sulphuric acid during any distillation step is avoided.

(3) Due to the absence of water, lower distillation temperatures are possible.

(4) Low distillation temperatures are desirable to minimize reactions of sulphuric acid with solvents.

(5) The sulphuric acid is recovered for reuse in practically original concentration.

(6) Continuous processing is facilitated as constant control of solvent concentrations, e. g., alcohol-water ratios, is not required.

The various processes of purification described are adaptable to the purification of all sulphonic acids, the solubility characteristics of which allow such a procedure. In a novel and simple manner such acids are purified and their value and field of utilization broadened through such purification.

Sulphonic acids which have been isolated from the sulphonation of a 95 visc. S. U. @ 100° F. raffinate were examined and the following physical and chemical characteristics determined:

Molecular weight_____ 404
Specific gravity @ 60° F._____ 1.0890
Refractive index at 20° F._____ 1.5120

Composition:

| | Percent |
|---|---|
| Carbon | 70.33 |
| Hydrogen | 9.21 |
| Sulphur | 8.34 |
| Oxygen | 12.12 |

The above composition corresponds to the formula $$C_{24}H_{35}SO_3H$$

or in general $$C_NH_{2N-12}SO_3$$

In the description of the initial steps of the process, e. g., the sulphonation step, it was stated that a partial separation of chemical constituents resulted from the addition of the sulphonating agent in increments. Through such use of increments it is possible to produce acid oils and acid sludges which contain a preponderance of one type of reaction products. Further by such preliminary segregation subsequent processing steps and the recovery of by-products, are facilitated. It is also found that while sulphonating, if the temperature as well as acid concentration is controlled, acids of different molecular weight may be isolated.

To illustrate: The base oil is treated with sulphuric acid of from 93% H₂SO₄ up to 50% fuming acid at normal temperatures, starting at say 70° F., and the temperature maintained within a range of about 20° F. by suitable control means. After the first two or three increments the acid oil is treated as described, in the drawing, to remove sulphonic acids contained therein. The oil is again treated with fuming acid and the sulphonic acids extracted from the oil. In this manner a series of acid sludges and a series of solvent extracts of sulphonic acids is obtained, thus accomplishing a selective sulphonation of the hydrocarbons. For example, the first few acid sludges will contain a good proportion of acid tar and only a relatively small amount of sulphonic acids. The later sludges will have higher concentrations of sulphonic acids. Of these sludges the first in which sulphonic acids predominate will yield acids of a different average molecular weight than sludges produced several acid increments later. Such a feature is due to the fact that the first sulphonic acids are produced from hydrocarbons which are more readily attacked whereas after removal of such hydrocarbons the acid must then attack the more difficultly sulphonated hydrocarbons. In the two cases the sulphonic acids produced will be of different type with respect to the structure of the organic radical. Similarly the various solvent extracts, containing sulphonic acids which had been removed from the oil after each acid treat, will have different types of sulphonic acids in solution.

When the yield of sulphonic acids at the first controlled temperature and SO₃ concentration becomes small, the treating temperature and/or SO₃ concentration are raised and the process repeated, again controlling the temperature within about 20° F. range. By such temperature and concentration control and by the addition of acid in increments progressive sulphonation of hydrocarbons takes place. Hence by the isolation of acid sludges and solvent extracts in steps and the separate recovery of sulphonic acids therefrom sulphonic acids of different average molecular weights and different structures can readily be obtained.

We claim:

1. The process of preparing sulphonic acids from hydrocarbon oils, which comprises: treating a petroleum oil with a sulphonating agent to provide sulphonic acids dissolved in the oil, removing the spent sulphonating agent, mixing the treated oil with an oil insoluble organic solvent to extract said dissolved sulphonic acids, separating the oil from said solvent, adding an acid of high hydrogen ion concentration to said solvent to effect separation of the sulphonic acids contained therein, and separately recovering said sulphonic acids.

2. The process of preparing sulphonic acids from hydrocarbon oils, which comprises: treating a petroleum oil with a sulphonating agent to provide sulphonic acids dissolved in the oil, removing the spent sulphonating agent, mixing the treated oil with an oil insoluble organic solvent to extract said dissolved sulphonic acids, separating the oil from said solvent, separating said solvents and contained sulphonic acids by distillation, adding sulphuric acid to the separated sulphonic acids to separate impurities, and separately recovering said sulphonic acids.

3. The process of preparing sulphonic acids from hydrocarbon oils, which comprises: treating a petroleum oil with a sulphonating agent to provide sulphonic acids dissolved in the oil, removing the spent sulphonating agent, mixing the treated oil with an oil insoluble organic solvent to extract said dissolved sulphonic acids, separating the oil from said solvent, separating said solvent and contained sulphonic acids by distillation, adding sulphuric acid to the separated sulphonic acids to separate impurities, diluting said mixture of sulphuric acid and sulphonic acids with a low boiling hydrocarbon solvent to separate said sulphonic acids, removing said hydrocarbon solvent, and separately recovering said sulphonic acids.

4. In a process of preparing sulphonic acids from hydrocarbon oils in which the oil is treated with sulphuric acid in increments and the acid sludge is removed from the oil after each increment while leaving the sulphonic acids produced dissolved in the oil, that combination of steps which comprises: progressively increasing the temperature of the oil after each increment of acid and withdrawing acid sludge after each increment.

5. In a process of preparing sulphonic acids from hydrocarbon oils in which the oil is treated with sulphuric acid in increments and the acid sludge is removed from the oil after each increment while leaving the sulphonic acids produced dissolved in the oil, that combination of steps which comprises: progressively increasing the temperature of the oil after each increment of acid and holding such increased temperature within a range of about 20° F., and withdrawing acid sludge after each increment.

6. The process according to claim 1 in which the acid of high hydrogen ion concentration is sulphuric acid.

7. The process of preparing sulphonic acids from hydrocarbon oils which comprises: treating a petroleum oil with a sulphonating agent in a series of increments to provide sulphonic acids dissolved in the oil, increasing the temperature of treatment with each increment, removing the spent sulphonating agent after the addition of each increment, extracting said sulphonic acids with an oil insoluble organic solvent after each increment, and recovering the sulphonic acids from said solvent.

8. The process of preparing sulphonic acids from hydrocarbon oils which comprises: treating a petroleum oil with a sulphonating agent in a series of increments to provide sulphonic acids dissolved in the oil, increasing the temperature of treatment with each increment, removing the spent sulphonating agent after the addition of each increment, extracting said sulphonic acids with an oil insoluble organic solvent after each increment, adding an acid of high hydrogen ion concentration to said solvent to effect separation of the sulphonic acids contained therein, and separately recovering said sulphonic acids.

ARTHUR LAZAR.
PAUL MORITZ RUEDRICH.